US012381477B2

(12) United States Patent
Ji et al.

(10) Patent No.: US 12,381,477 B2
(45) Date of Patent: Aug. 5, 2025

(54) ADAPTIVE START-UP CONTROL CIRCUIT

(71) Applicant: TEXAS INSTRUMENTS INCORPORATED, Dallas, TX (US)

(72) Inventors: Jing Ji, Hangzhou (CN); Jian Liang, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 237 days.

(21) Appl. No.: 17/974,685

(22) Filed: Oct. 27, 2022

(65) Prior Publication Data

US 2024/0146183 A1    May 2, 2024

(51) Int. Cl.
*H02M 1/36* (2007.01)
*H02M 1/00* (2006.01)
*H02M 1/14* (2006.01)

(52) U.S. Cl.
CPC ........... *H02M 1/36* (2013.01); *H02M 1/0045* (2021.05); *H02M 1/14* (2013.01)

(58) Field of Classification Search
CPC ......... H02M 1/0045; H02M 1/14; H02M 1/36
USPC ....................................................... 323/271
See application file for complete search history.

(56) References Cited

U.S. PATENT DOCUMENTS

| 2021/0018541 | A1* | 1/2021 | Bayat | ............... | G11C 7/04 |
| 2021/0208617 | A1* | 7/2021 | Strydom | ............ | G05F 1/565 |
| 2022/0158537 | A1* | 5/2022 | Xie | .................... | H02M 1/08 |
| 2022/0416654 | A1* | 12/2022 | Imura | ............... | H02M 1/0032 |

OTHER PUBLICATIONS

Texas Instruments, "TPS61099x Synchronous Boost Converter with Ultra-Low Quiescent Current", TPS61099, SLVSD88L, Aug. 2021, 24 pages, Dallas, Texas, US.

* cited by examiner

*Primary Examiner* — Yemane Mehari
(74) *Attorney, Agent, or Firm* — Valerie M. Davis; Frank D. Cimino (57) ABSTRACT

In some examples, an apparatus includes a filter, a voltage-to-current conversion circuit, a first current source, a second current source, a capacitor, a comparator, and a buffer. The filter has a first input voltage (VIN) input and a filter output. The voltage-to-current conversion circuit has a first input, a second VIN input, and a current output, the first input coupled to the filter output. The first current source is coupled between the current output and ground terminal. The second current source is coupled between a power terminal and the current output. The capacitor is coupled between the current output and ground terminal. The comparator has a comparator output, a comparator input, and a reference voltage (Vref) input, the comparator input coupled to the current output. The buffer has a buffer input and a buffer output, the buffer input coupled to the comparator output.

20 Claims, 8 Drawing Sheets

ADAPTIVE START-UP CONTROL CIRCUIT

BACKGROUND

A switched mode power supply (SMPS) transfers power from an input power source to a load by switching one or more power transistors of a power converter, or other switching elements of the power converter, coupled through a switch node/terminal to an energy storage element (such as an inductor, an inductance of a transformer, and/or a capacitor), which is capable of coupling to the load. The input voltage to the power converter may be greater than, less than, or equal to the output voltage. If the input voltage is less than the output voltage, the converter/regulator may be referred to as a "step-up" converter/regulator or a "boost converter." If the input voltage is greater than the output voltage, the converter may be referred to as a "step-down" converter/regulator or a "buck converter." If the converter/regulator can perform both step-up and step-down functions, then it may be referred to as a "buck-boost converter." The power transistors can be included in a power converter that includes, or is capable of coupling to, the energy storage element. A SMPS can include a SMPS controller to provide one or more gate drive signals to the power transistor(s).

SUMMARY

In some examples, an apparatus includes a filter, a voltage-to-current conversion circuit, a first current source, a second current source, a capacitor, and a comparator. The filter has a first input voltage (VIN) input and a filter output. The voltage-to-current conversion circuit has a first input, a second VIN input, and a current output, the first input coupled to the filter output. The first current source is coupled between the current output and ground terminal. The second current source is coupled between a power terminal and the current output. The capacitor is coupled between the current output and ground terminal. The comparator has a comparator output, a comparator input, and a reference voltage (Vref) input, the comparator input coupled to the current output.

In some examples, an apparatus includes a filter, a voltage-to-current conversion circuit, a first current source, a second current source, a capacitor, and a comparator. The filter has a first VIN input and a filter output and is configured to provide a filtered signal in which transient oscillations of VIN are attenuated. The voltage-to-current conversion circuit has a first input, a second VIN input, and a current output, the first input coupled to the filter output. The voltage-to-current conversion circuit is configured to provide a signal having a current value representative of a voltage differential between the filtered signal and VIN. The first current source is coupled between the current output and ground terminal and is configured to provide a discharge current. The second current source is coupled between a power terminal and the current output and is configured to provide a charge current. The capacitor is coupled between the current output and ground terminal and is configured to integrate a current provided at the current output to form a capacitor voltage. The comparator has a comparator output, a comparator input, and a Vref input, the comparator input coupled to the current output. The comparator is configured to compare the capacitor voltage to Vref to provide a comparison result.

In some examples, a system includes a first power terminal, a load, a power converter, and a circuit. The power converter has a first VIN input and an output voltage (VOUT) output, the first VIN input coupled to the first power terminal and the VOUT output coupled to the load. The circuit includes a filter, a voltage-to-current conversion circuit, a first current source, a second current source, a capacitor, a comparator, and a buffer. The filter has a second VIN input and a filter output. The voltage-to-current conversion circuit has a first input, a third VIN input, and a current output, the first input coupled to the filter output. The first current source is coupled between the current output and ground terminal. The second current source is coupled between a second power terminal and the current output. The capacitor is coupled between the current output and ground terminal. The comparator has a comparator output, a comparator input, and a Vref input, the comparator input coupled to the current output. The buffer has a buffer input and a buffer output, the buffer input coupled to the comparator output, and the buffer output coupled to the power converter.

DETAILED DESCRIPTION

As described above, a buck converter receives an input voltage (VIN) having a first value and provides an output voltage (VOUT) having a second value that is less than the first value. Although a buck converter is described herein, the teachings of this description are also applicable to boost converters, buck-boost converters, and other converters that include a switching elements that facilitate control of timing of durations of conductive states of the respective converters. To control a mode of operation of the power converter, a controller provides gate control signals to one or more power transistors of the power converter. The gate control signals received by a power transistor control whether the power transistor is in a conductive state (e.g., turned on) or in a non-conductive state (e.g., turned off). Each state of a power converter involves a specific combination of transistors that are in conducting states and transistors that are in non-conducting states. To change a mode of operation of the power converter, the controller modifies the sequence of switching states that it commands the transistors to assume. In at least some examples, the controller implements a state machine or other logic such that values of the gate control signals are determined based on a mode of operation of, or for, the power converter.

During start-up of some implementations of a SMPS, the power transistors may be switched at a fixed frequency and duty cycle until VOUT reaches a programmed value. This fixed approach may result from at least some components of the SMPS not yet being in an operational state during start-up. Such implementations include an SMPS configured for low VIN operation, such as for input voltages having a value as low as approximately 0.7 volts (V) and the programmed value may be approximately 1.8 V. For some types of input power sources, such as batteries, the fixed approach may be non-optimal and cause a drop in value of VIN resulting from loading. For example, a power source that has a high internal resistance, such as a discharged, or partially discharged, battery may experience loading based on the fixed frequency approach, causing a reduction in value of VIN that may not be experienced by power sources that do not have the high internal resistance. The reduction in value of VIN, in some implementations, causes an undervoltage condition that can cause a system shutdown for the SMPS or another component, such as based on the triggering or invocation of undervoltage protection circuitry.

Examples of this description include a circuit having an adaptive start-up capability. The adaptive start-up capability controls startup of a SMPS, such as switching of power transistors, based on an impedance of a power source of the SNIPS. Based on the impedance of the power source, a voltage ripple is induced in VIN that has a relationship to the impedance. For example, an amplitude of the voltage ripple for a power source may increase as internal impedance of the power source increases. In some examples, a start-up control circuit monitors VIN as provided by the power source to the SNIPS. The start-up control circuit monitors VIN by providing a current having a value proportional to a difference between a filtered version of VIN and an unfiltered version of VIN. Based on the current, the start-up control circuit controls the SNIPS to have an increased off time, denoted as Toff. For example, the current is summed with Toff currents to form a discharge current. A capacitor is discharged according to the discharge current. In some examples, a discharge rate of the capacitor indirectly controls, or is proportional to, Toff for the SNIPS. A voltage of the capacitor is compared to a reference voltage (Vref) and a result of the comparison drives a buffer. An output signal of the buffer controls a power transistor of the SNIPS, such as a low-side power transistor. In this way, based on the amplitude of the detected ripple, a frequency of the output signal of the buffer is altered, such as to increase Toff. Increasing Toff, as described above, decreases an average input current of the SNIPS, thereby mitigating the drop in value of VIN, as described above, that may cause the occurrence of an undervoltage event.

Figure 1:
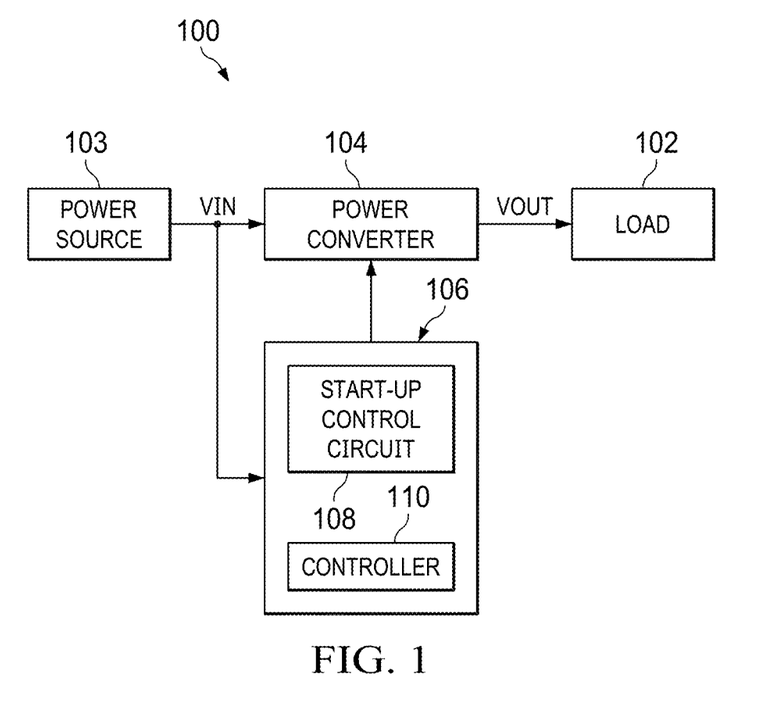
FIG. 1 is a block diagram of a system, in accordance with various examples.

FIG. 1 is a block diagram of a system 100, in accordance with various examples. The system 100 is representative of an application in which a power is provided to a load. For example, the system 100 is representative of an automobile or other vehicle, a computing device such as a laptop, a notebook, a server, a smartphone, a tablet, a wearable device, a healthcare device, a sensor, or the like, a SNIPS or other power supply, etc. In an example, the system 100 includes a load 102, a power source 103, a power converter 104, and control circuitry 106. In some examples, the power converter 104 is instead referred to as a power stage. The control circuitry 106 includes a start-up control circuit 108 and a controller 110. In some examples, the system 100 includes a gate driver (not shown), such as coupled between the control circuitry 106 and the power converter 104. The components of the system 100 are coupled, as shown in FIG. 1, for example.

In an example of operation of the system 100, the power converter 104 receives VIN from the power source 103 and provides VOUT based on VIN and control exerted by the control circuitry 106. In some implementations, the power converter 104 is a boost power converter such that VOUT is greater in value than VIN. In examples, VOUT is provided to the load 102, such as to power components (not shown) of the load 102 and/or facilitate other operation of the load 102. In an example, the control circuitry 106 controls the power converter 104 to cause the power converter 104 to provide VOUT based on VIN. For example, the control circuitry 106 provides gate control signals that cause the switches (not shown) of the power converter 104 to turn on or off. The gate control signals may be timed such that a switch of the power converter 104 is on (e.g., in a conductive state) for an amount of time determined based on a programmed value for VOUT. For example, for a greater value of VOUT with respect to VIN the gate control signals may cause a switch of the power converter 104 to be on (e.g., conductive) for a longer period of time than for a lesser value of VOUT with respect to VIN.

During start-up of the system 100, the start-up control circuit 108 controls operation of a portion of the power converter 104 and the controller 110 controls operation of a remainder of the power converter 104. In some examples, subsequent to start-up of the system 100, the controller 110 controls operation of the power converter 104. Some implementations of the controller 110 include a loop controller (not shown) for controlling the power converter 104 according to any suitable control process or scheme, the scope of which is not limited herein. The control circuitry 106 may also include selection circuitry (not shown) to select between control via the start-up control circuit 108 or the controller 110 (such as via the loop controller). In some examples, the selection is made based on a value of VOUT with respect to a reference voltage, such as determined by a comparator comparing VOUT to the reference voltage. In an example, the start-up control circuit 108 monitors VIN, as described above, during start-up of the system 100. During this time, based on an amplitude of voltage ripple of VIN, the start-up control circuit 108 controls the power converter 104 to increase Toff. Toff is an amount of time for which an energy storage element (e.g., such as an inductor) of the power converter 104 is not charging. By controlling the power converter 104 according to the voltage ripple of VIN to increase Toff, average input current of the power converter 104 (e.g., current drawn by the power converter 104 from the power source 103) is reduced, thereby reducing a loading effect of the power converter 104 on the power source 103. Reducing this loading effect mitigates, or otherwise reduces an amount of, a drop in value of VIN caused by the loading effect in combination with an internal resistance of the power source 103.

Figure 2:
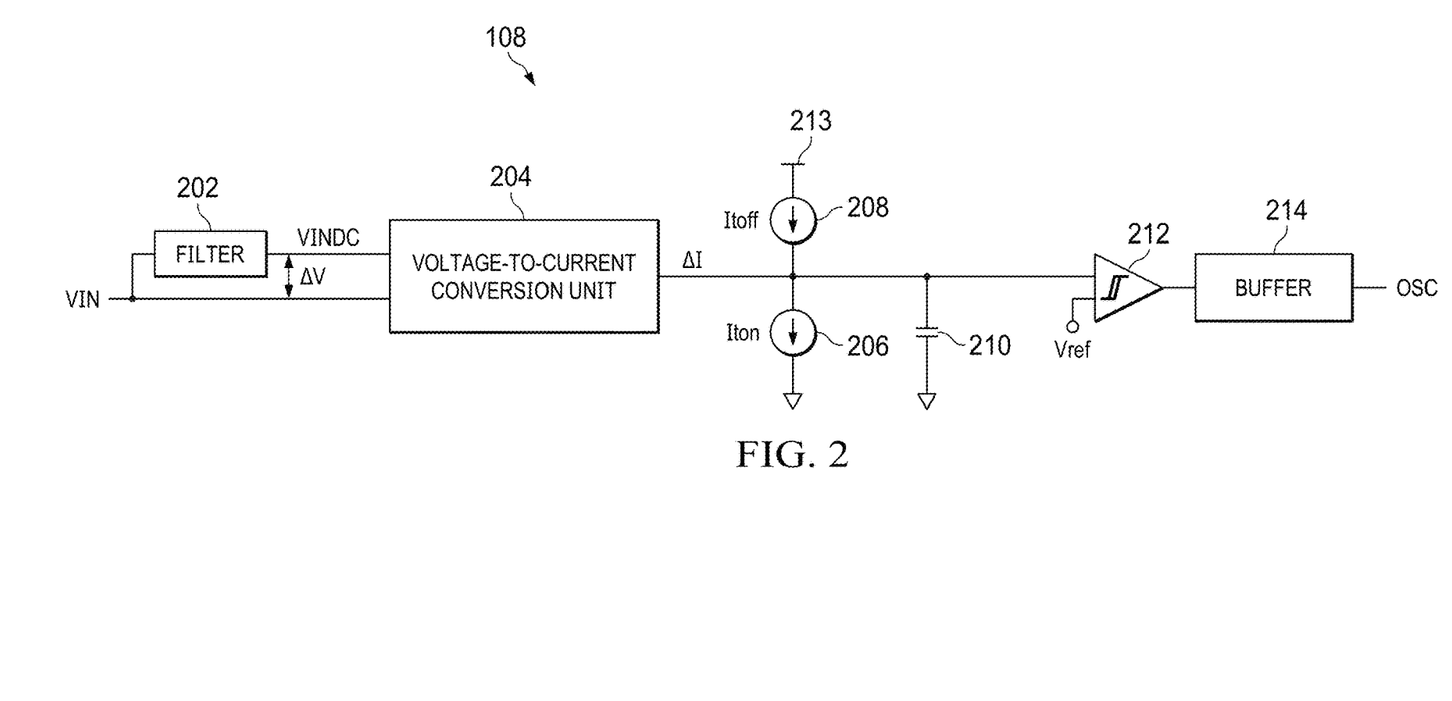
FIG. 2 is a block diagram of a start-up control circuit, in accordance with various examples.

FIG. 2 is a block diagram of the start-up control circuit 108, in accordance with various examples. In some examples, the start-up control circuit 108 includes a filter 202, a voltage-to-current conversion circuit 204, a current source 206, a current source 208, a capacitor 210, comparator 212, and a buffer 214. In an example architecture of the start-up control circuit 108, the filter 202 has a filter input configured to receive VIN, such as by coupling to the power source 103, and an output. In some examples, the filter is a low-pass filter. The voltage-to-current conversion circuit 204 has a first input coupled to the output of the filter 202, a second input configured to receive VIN, and an output. In an example, the first input of the voltage-to-current conversion circuit 204 is a non-inverting input and the second input of the voltage-to-current conversion circuit 204 is an inverting input. The current source 206 is coupled between the output of the voltage-to-current conversion circuit 204 and ground. The current source 208 is coupled between a power source 213 and the output of the voltage-to-current conversion circuit 204. The capacitor 210 is coupled between the output of the voltage-to-current conversion circuit 204 and ground. The comparator 212 has a first input coupled to the voltage-to-current conversion circuit 204, a second input coupled to a Vref terminal, and an output. In an example, the first input of the comparator 212 is a non-inverting input and the second input of the comparator 212 is an inverting input. The buffer 214 has an input coupled to the output of the comparator 212 and an output coupled to the power converter 104, such as to a gate of a low-side power transistor of the power converter 104, and to the voltage-to-current conversion circuit 204.

In an example of operation of the start-up control circuit 108, the filter 202 receives and filters VIN to provide a filtered signal. In some examples, the filtering is a low-pass filtering. In other examples, the filter 202 may perform any filtering suitable for an application environment in which the start-up control circuit 108 is implemented. In some examples, the filtering removes or attenuates transient oscillations, such as voltage ripple, of VIN to form the filtered signal. The filtered signal, represented in FIG. 2 as VINDC, and an unfiltered version of VIN, are received by the voltage-to-current conversion circuit 204. In an example, the filtered signal and VIN have a voltage differential, represented in FIG. 2 as ΔV. The voltage differential results from the ripple present in VIN that has been filtered out in the filtered signal. The voltage-to-current conversion circuit 204 provides a current, represented in FIG. 2 as ΔI, having a value proportional to the voltage differential between the filtered signal and VIN. In some examples, ΔI is produced by a transconductance circuit (not shown), such as a transconductance amplifier.

During a charging time of the power converter 104, the capacitor 210 is charged according to Iion, as provided by the current source 206. Based on ΔI and a current Itoff, as provided by the current source 208, the capacitor 210 is discharged. For example, the capacitor 210 is discharged at a rate of Itoff-ΔI. In this way, Itoff, and correspondingly the Toff time of the power converter 104, are modified according to ΔI. The charging and discharging of the capacitor 210 provides a voltage (e.g., a capacitor voltage) at the first input of the comparator 212. The comparator 212 compares the capacitor voltage to Vref, providing a comparison result having an asserted value responsive to the capacitor voltage exceeding Vref. In some examples, the comparison result having an asserted value causes the power converter 104 to charge an energy storage element (e.g., the on time (e.g., Ton) beings responsive to the comparison result having an asserted value) and the capacitor 210 to discharge, as described above. Some examples of the comparator 212 include hysteresis. The inclusion of hysteresis mitigates the comparator 212 introducing oscillations into the start-up control circuit 108 in scenarios in which the capacitor voltage and Vref are approximately equal in value. As such, the comparator 212 may provide the comparison result having a deasserted value responsive to the capacitor voltage decreases to a value of approximately Vref-Vhys, where Vhys is the hysteresis voltage or threshold of the comparator 212. In some examples, the comparison result having a deasserted value causes the power converter 104 to discharge an energy storage element (e.g., the Toff time beings responsive to the comparison result having a deasserted value) and the capacitor 210 to charge, as described above. Based on the comparison result, the buffer 214 provides a control signal (OSC) for controlling the power converter 104, such as controlling a low-side power transistor of the power converter 104. In some examples, the buffer 214 is instead implemented as a driver. In some examples, functionality of the start-up control circuit 108 may be similar in some regards to operation of an oscillator in that the start-up control circuit 108 receives VIN and provides OSC based on VIN and having a frequency that is determined based on variation in value of VIN.

Figure 3:
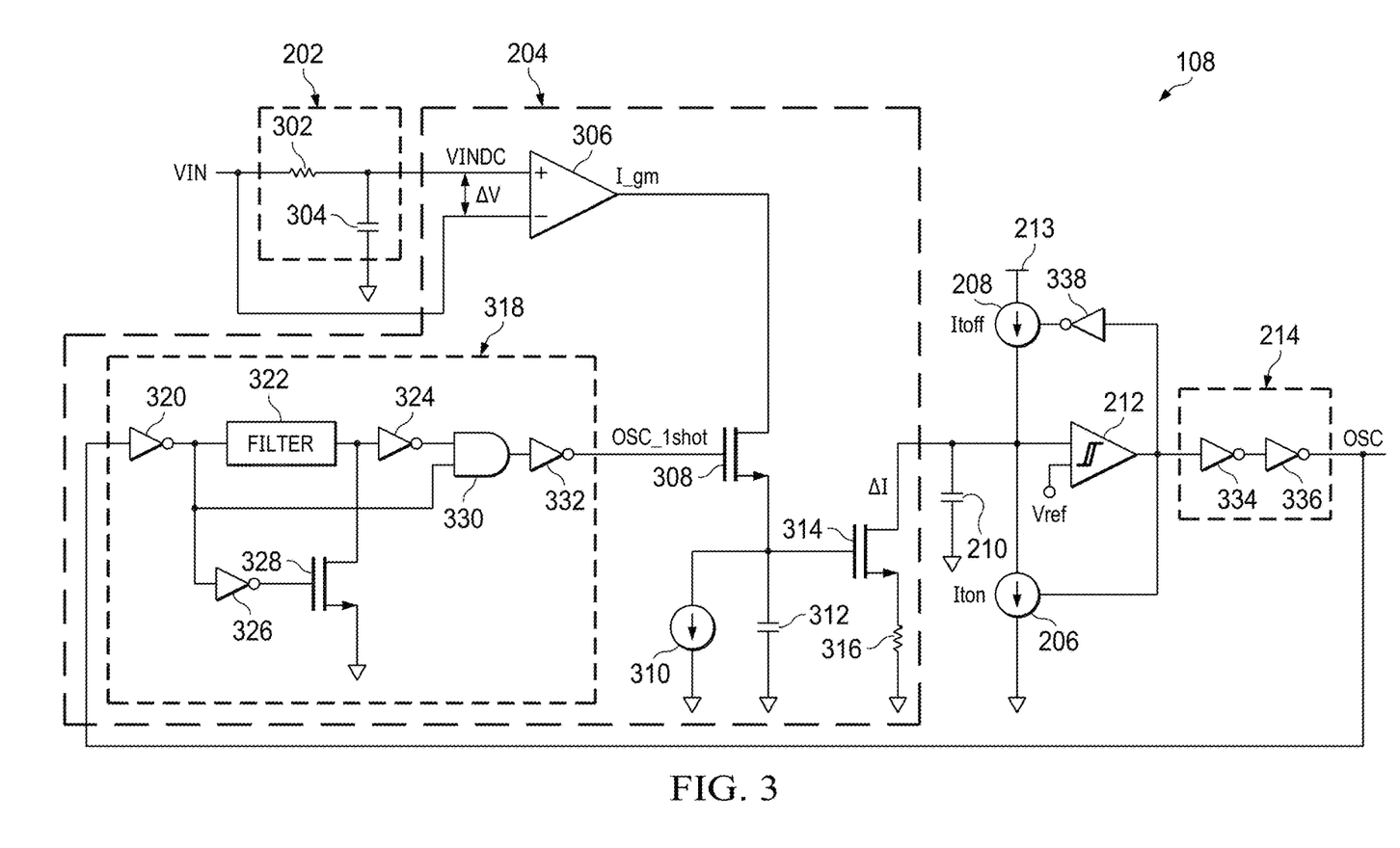
FIG. 3 is a schematic diagram of a start-up control circuit, in accordance with various examples.

FIG. 3 is a schematic diagram of the start-up control circuit 108, in accordance with various examples. In an example architecture of the start-up control circuit 108, the filter 202 includes a resistor 302 and a capacitor 304. The resistor 302 is coupled between a VIN terminal and the first input of the voltage-to-current conversion circuit 204. The capacitor 304 is coupled between the second input of the voltage-to-current conversion circuit 204 and ground. The voltage-to-current conversion circuit 204 includes a transconductance circuit 306, a transistor 308, a current source 310, a capacitor 312, a transistor 314, a resistor 316, and a one-shot circuit 318. In some examples, the one-shot circuit 318 includes an inverter 320, a filter 322, an inverter 324, an inverter 326, a transistor 328, a logic circuit 330, and an inverter 332. In an example, the transconductance circuit 306 is a transconductance amplifier having an output, a non-inverting input (e.g., the first input of the voltage-to-current conversion circuit 204) and an inverting input (e.g., the second input of the voltage-to-current conversion circuit 204). The output of the transconductance circuit 306 is coupled to a drain of the transistor 308. A gate of the transistor 308 is coupled to an output of the one-shot circuit 318. The current source 310 and the capacitor 312 are each coupled between a source of the transistor 308 and ground. A gate of the transistor 314 is coupled to the source of the transistor 308 and a source of the transistor 314 is coupled to ground through the resistor 316. In an example, the drain of the transistor 314 is the output of the voltage-to-current conversion circuit 204. The start-up control circuit 108 also includes an inverter 338 coupled between the output of the comparator 212 and a control input of the current source 208. The current source 206 has a control input coupled to the output of the comparator 212. In some examples, the buffer 214 includes inverters 336 and 334 arranged in a back-to-back arrangement.

The inverter 320 has an input coupled to an output of the buffer 214 (e.g., an output of the inverter 336 as shown in FIG. 3), as described above, and an output. The filter 322 has an input coupled to the output of the inverter 320 and an output. In some examples, the filter 322 is a low-pass filter. In other examples, the filter 322 has any suitable architecture (e.g., high-pass, bandpass, bandgap, etc.) for an application environment in which the start-up control circuit 108 is implemented. The inverter 324 has an input coupled to the output of the filter 322 and an output. The inverter 326 has an input coupled to the output of the inverter 320 and an output. The transistor 328 has a gate coupled to the output of the inverter 326, a drain coupled to the input of the inverter 324, and a source coupled to ground. The logic circuit 330 has a first input coupled to the output of the inverter 324, a second input coupled to the output of the inverter 320, and an output. In some examples, the logic circuit 330 performs an AND logical operation between signals received at its first and second inputs to determine a value of an output signal provided at its output. The inverter 332 has an input coupled to the output of the logic circuit 330 and an output coupled to the gate of the transistor 308, as described above.

In an example of operation of the start-up control circuit 108, the resistor 302 and the capacitor 304 filter VIN to provide a direct current (DC) representation of VIN, such as by filtering out or removing ripple or other transient components, such as transient oscillations, of VIN to provide VINDC, as described above. The transconductance circuit 306 receives VINDC and VIN and provides an output current, Igm, having a value proportional to a difference between VINDC and VIN (e.g., I_gm has a value proportional to VINDC-VIN). In this way, I_gm may represent a ripple current. Based on OSC_1shot, conductance of the transistor 308 is controlled. In some examples, OSC_1shot is provided by the one-shot circuit 318 to control timing of the start-up control circuit 108. For example, I_gm may vary in value based on the internal resistance of the power source 203, as described herein. Based on OSC_1shot, a set time window is provided for conduction by the transistor 308. I_gm, as conducted through the transistor 308, is integrated by the capacitor 312 to provide a voltage at the gate of the transistor 314. An amount of time for the integration to be performed is controlled by an amount of time for which OSC_1shot is asserted. Responsive to the voltage at the gate of the transistor 314 exceeding a threshold of the transistor 314, the transistor 314 becomes conductive and ΔI flows through the transistor 314. Responsive to de-assertion of OSC_1shot, and therefore the transistor 308 being in a non-conductive state, the capacitor 312 is discharged at a rate determined by a current of the current source 310.

In some examples, the one-shot circuit 318 provides OSC_1shot based on a value of an output signal provided by the buffer 214. For example, the output signal of the buffer 214 is inverted by the inverter 320 and filtered by the filter 322 prior to undergoing another inversion via the inverter 324. The output signal of the buffer 214 is also inverted by the inverter 326 and provided as a gate control signal to the transistor 328. Output signals of the inverter 320 and inverter 324 are received by the logic circuit 328 and, responsive to both signals having asserted values, the logic circuit 330 provides an output signal having an asserted value. The output signal of the logic circuit 330 is inverted via the inverter 332 to provide OSC_1shot at the output of the inverter 332. In some examples, the transistor 328 creates a discharge path, while conductive, between the input of the inverter 324 and ground. In this way, responsive to the transistor 328 being in a conductive state, the input of the inverter 324 is pulled to ground at a rate determined according to component values of the filter 322 (e.g., a time constant, such as resistor-capacitor time constant, of the filter 322). Responsive to the transistor 328 being in a non-conductive state, the input of the inverter 324 is pulled up at a rate determined according to the component values of the filter 322. As a result, OSC_1shot is controlled to have an asserted value for a fixed, periodic duration, irrespective of the value of I_gm.

During a period of time that the comparison result provided by the comparator 212 is deasserted, the current source 208 is controlled to charge the capacitor 210. Responsive to a voltage of the capacitor 210 exceeding Vref, the comparison result is provided having an asserted value. The asserted value of the comparison result is inverted by the inverter 334 to cause the current source 208 to become nonconductive. Also responsive to the comparison result having an asserted value, the current source 208 is controlled to become conductive. As described above with respect to FIG. 2, while the current source 206 is conductive and the current source 208 is non-conductive, the capacitor 210 is discharged at a rate of Itoff-ΔI. Responsive to the capacitor 210 being discharged a sufficient amount to cause the capacitor voltage to be less than Vref, the comparator 212 provides the comparison result having a deasserted value. Based on the comparison result, the buffer 214 provides a control signal to the power converter 104. For example, responsive to the comparison result having an asserted value, the control signal has an asserted value. Similarly, responsive to the comparison result having a deasserted value, the control signal has a deasserted value. The buffer 214 provides the control signal to control Toff of the power converter 104. In an example, Toff is modified according to ΔI, as described above. For example, the start-up control circuit 108 controls the power converter 104 such that Toff=C*Vref/(Itoff-ΔI), where C is a capacitance of the capacitor 210. In examples of the system 100 or start-up power circuit 108 in which the power source 103 has a small internal resistance, such as 0.1 Ohms or less, ΔI has a value of approximately zero, and therefore Toff is unaffected. As the internal resistance of the power source 103 increases, the start-up power circuit 108 controls the power converter 104 to increase Toff based on ΔI increasing in value to a positive, non-zero value. By controlling Toff based on the internal resistance of the power source 103, the start-up control circuit 108 is adaptive, adapting the start-up of the power converter 104 to the internal resistance of the power source 103. In some examples, such adaptation mitigates a drop in voltage of the power source 103 responsive to loading effects of the power converter 104, such as in circumstances in which the power source 103 is exhibiting a large internal resistance. Mitigating the drop in voltage of the power source 103 prevents adverse effects to the power converter 104 or load 102, such as undervoltage shutdowns.

Figure 4:
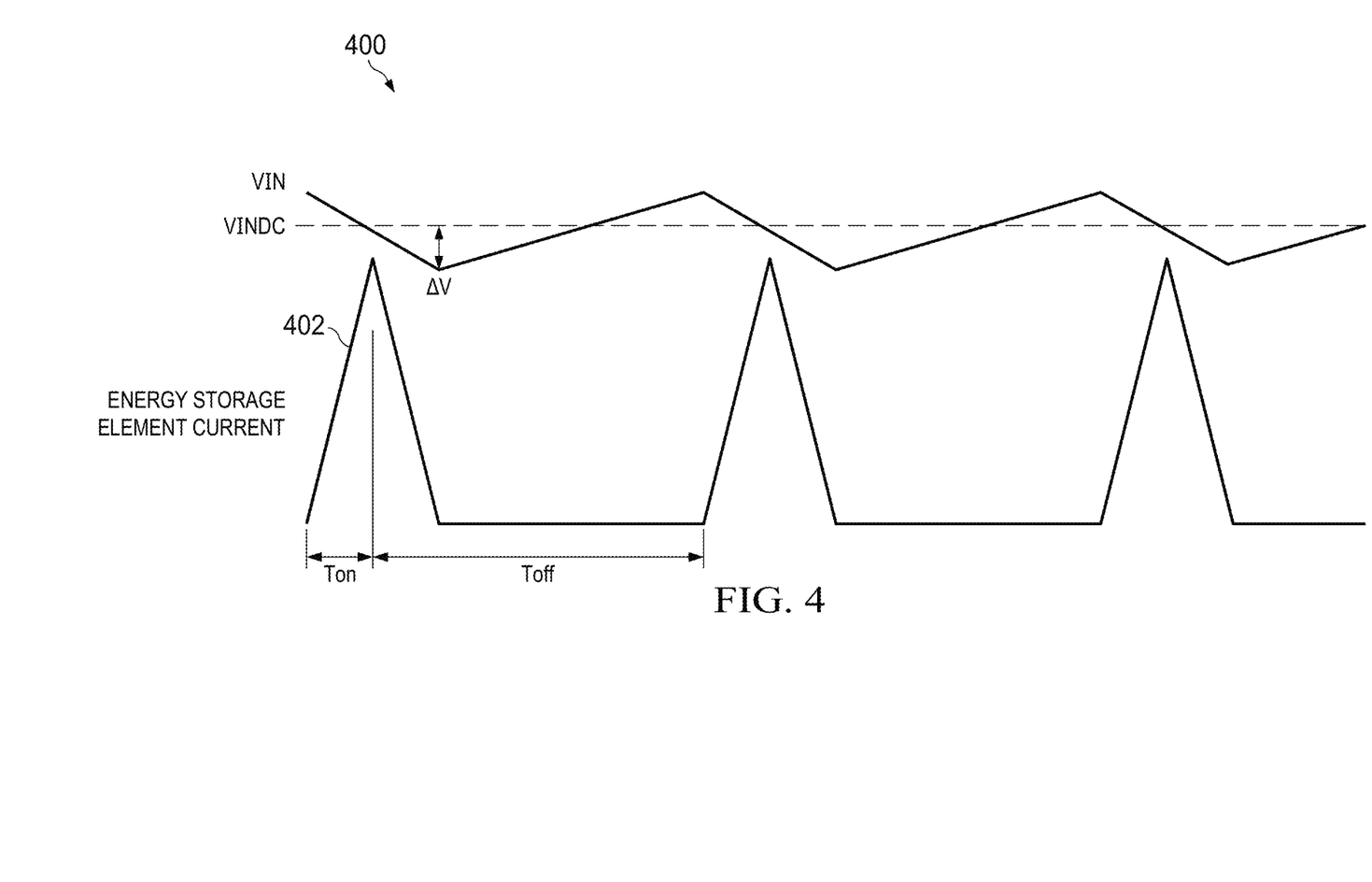
FIG. 4 is a timing diagram of signals, in accordance with various examples.

FIG. 4 is a timing diagram 400 of signals, in accordance with various examples. In some examples, the diagram 400 is representative of signals associated with a system, such as the system 100. Accordingly, reference may be made in describing the diagram 400 to components or signals described above with respect to any of the preceding figures. The diagram 400 includes VIN, VINDC, and a signal 402 that represents a current of an energy storage element, such as an inductor, of the power converter 104.

As shown in FIG. 4, VIN decreases because of loading effects of the energy storage element as current flows into and out of the energy storage element. During a time in which the energy storage element is neither charging nor discharging, VIN increases in value. This decreasing and increasing in value creates transient oscillations in the value of VIN, sometimes referred to as voltage ripple. These oscillations may increase in amplitude responsive to a source of VIN, such as the power source 103, having a high internal resistance. By filtering VIN to form VINDC, these transient oscillations are removed, creating ΔV between VIN and VINDC, as described above. As also shown in FIG. 4, a period of time during which the energy storage element is charging is Ton and a period of time in which the energy storage element is not charging is Toff. By controlling a duration of Toff based on the amount of ripple (e.g., a value of ΔV), and therefore an internal resistance of the power source 103, a drop in value of VIN resulting from loading of the power converter 104 and the internal resistance of the power source 103 is reduced.

Figure 5:
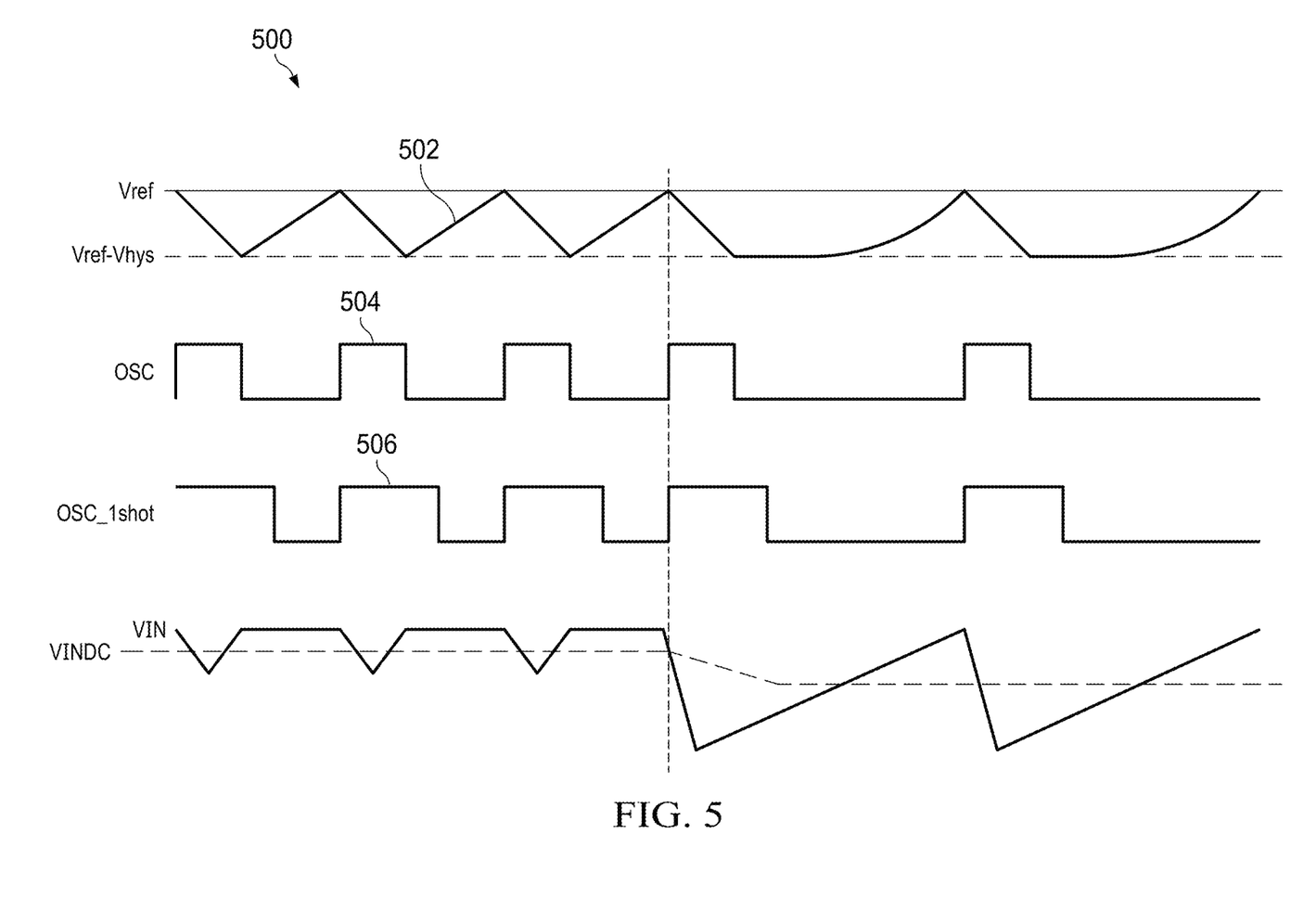
FIG. 5 is a timing diagram of signals, in accordance with various examples.

FIG. 5 is a timing diagram 500 of signals, in accordance with various examples. In some examples, the diagram 500 is representative of signals associated with a system, such as the system 100. Accordingly, reference may be made in describing the diagram 500 to components or signals described above with respect to any of the preceding figures.

The diagram 500 includes Vref, Vref-Vhys, a signal 502 representative of a voltage provided at the first input of the comparator 212, a signal 504 representative of the control signal provided by the buffer 214, and a signal 506 representative of a voltage provided at the gate of the transistor 308, VIN, VINDC.

As shown in FIG. 5, responsive to a value of the signal 502 increasing to Vref, the signal 504 (OSC) becomes asserted and the signal 502 begins to decrease in value. Responsive to the signal 502 decreasing in value to approximately equal Vref-Vhys, the signal 504 becomes deasserted and the signal 502 begins to increase in value. As described above with respect to FIG. 3, the signal 506 (OSC_1shot) is derived from the signal 504 such that rising edges of the signal 504 and the signal 506 are aligned and the signal 506 is asserted for a programmed amount of time. FIG. 5 includes a vertical dividing line. A left-side portion of FIG. 5 is representative of operation of the system 100 in examples in which the power source 103 has a small internal resistance, such as an internal resistance of approximately 0.1 ohms. A right-side portion of FIG. 5 is representative of operation of the system 100 in examples in which the power source 103 has a large internal resistance, such as an internal resistance of approximately 10 ohms. As shown in FIG. 5, the increased Toff resulting from modification of the discharge time of the signal 502 according to ΔI mitigates a large drop in value of VINDC, such as shown below in FIG. 6A, preventing, or reducing a likelihood, of the occurrence of an undervoltage condition occurring for the system 100 during a time period represented by FIG. 5.

Figure 6A:
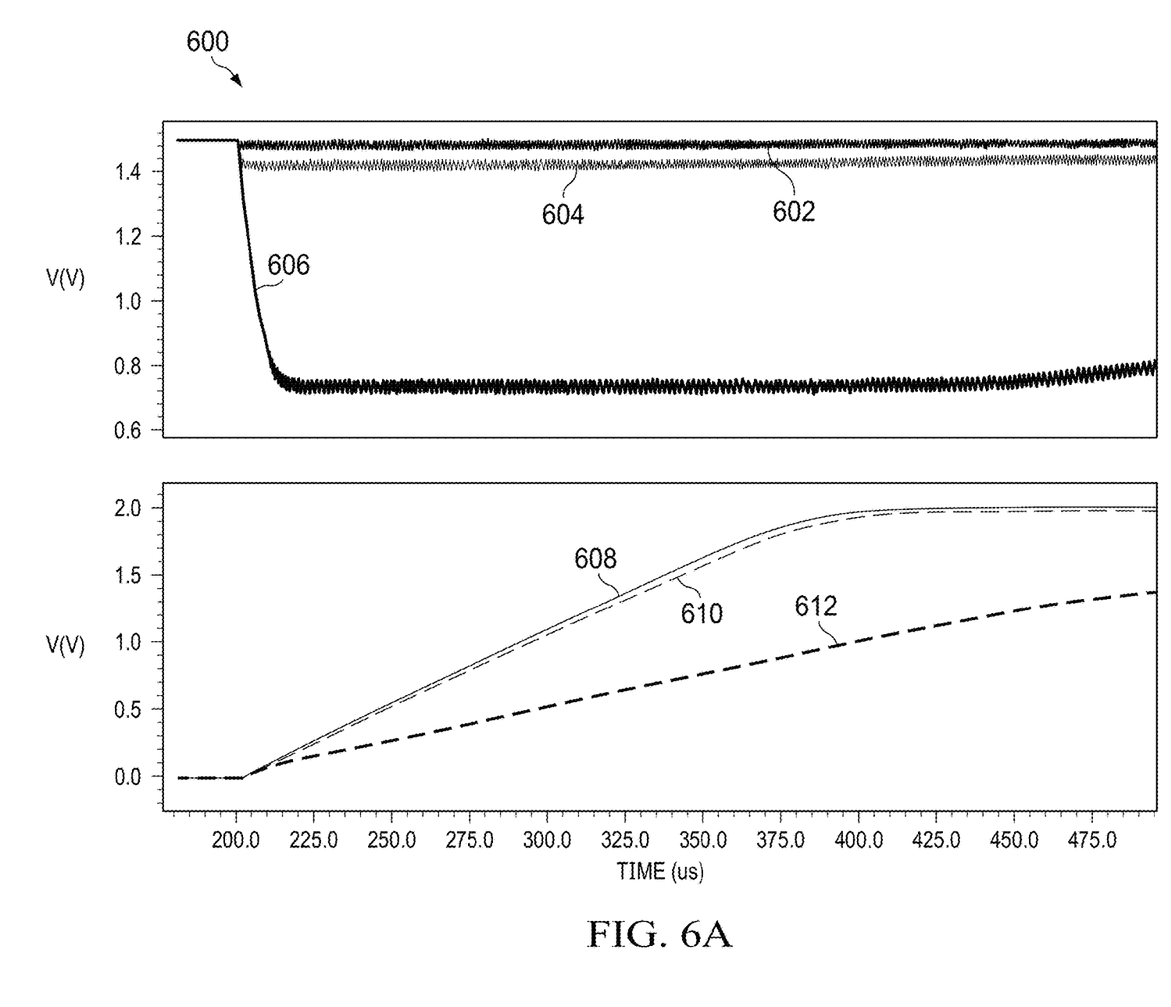
FIG. 6A is a timing diagram of signals, in accordance with various examples.

FIG. 6A is a timing diagram 600 of signals, in accordance with various examples. In some examples, the diagram 600 is representative of signals associated with a system, such as the system 100. Accordingly, reference may be made in describing the diagram 600 to components or signals described above with respect to any of the preceding figures. In an example, the diagram 600 is representative of an example of the system 100 that lacks the start-up control circuit 108, or for which the start-up control circuit 108 is disabled. The diagram 600 includes a signal 602 representative of VIN for a power source 103 with an internal resistance of 0.15 Ohms, a signal 604 representative of VIN for a power source 103 with an internal resistance of 0.75 Ohms, a signal 606 representative of VIN for a power source 103 with an internal resistance of 10 Ohms, a signal 608 representative of VOUT for a power source 103 with an internal resistance of 0.15 Ohms, a signal 610 representative of VOUT for a power source 103 with an internal resistance of 0.75 Ohms, and a signal 612 representative of VOUT for a power source 103 with an internal resistance of 10 Ohms. As shown by the diagram 600, the signal 606 includes a greater drop in value than the signals 602 or 604. The drop in value of the signal 606 is also represented in a drop in value of the signal 612, which can adversely affect the system 100, such as operation of the load 102. For example, the reduction in value of the signal 612 may cause the load 102 to implement a safety mechanism that causes the load 102 to shut down as a result of an undervoltage condition.

Figure 6B:
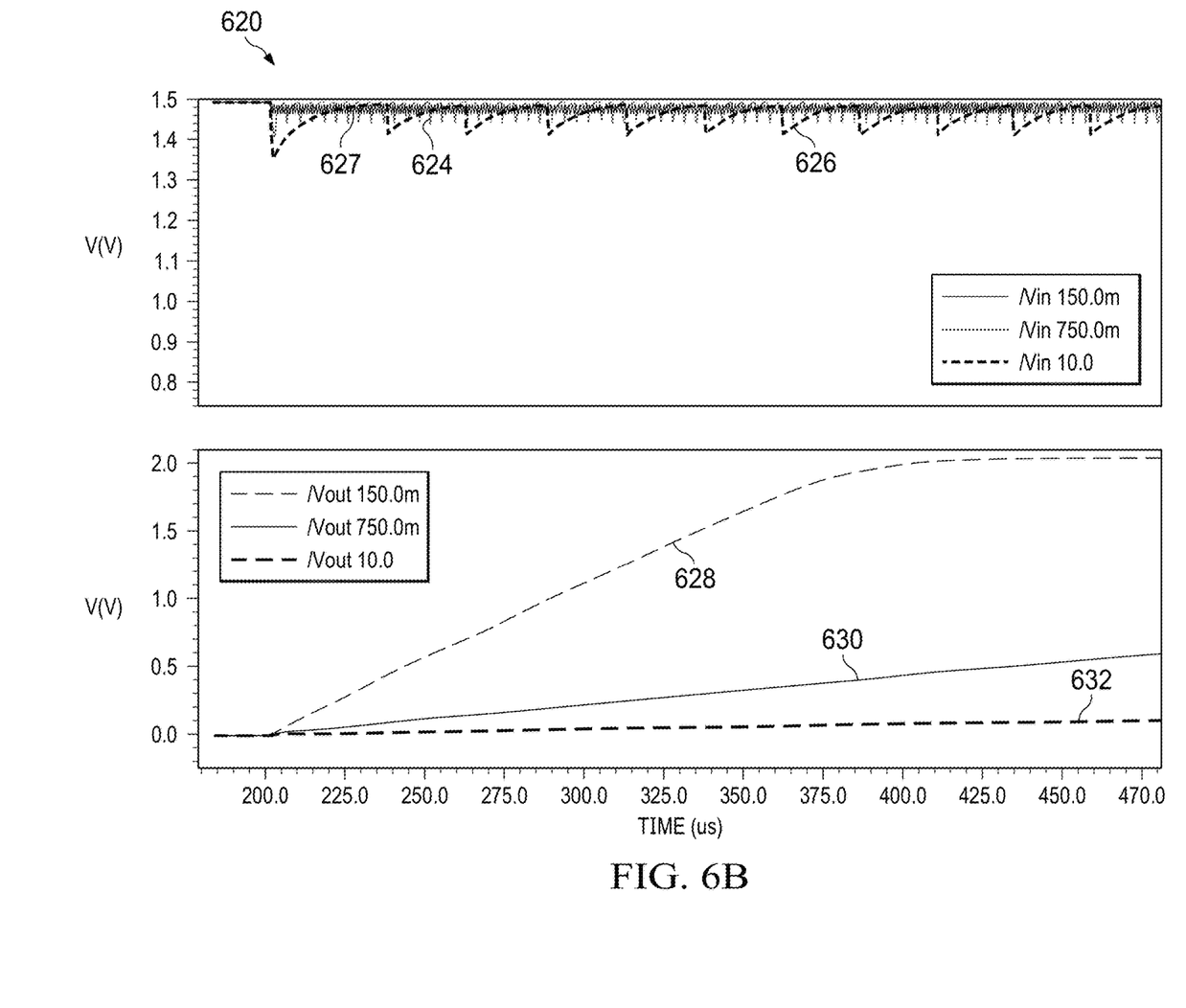
FIG. 6B is a timing diagram of signals, in accordance with various examples.

FIG. 6B is a timing diagram 620 of signals, in accordance with various examples. In some examples, the diagram 620 is representative of signals associated with a system, such as the system 100. Accordingly, reference may be made in describing the diagram 620 to components or signals described above with respect to any of the preceding figures. In an example, the diagram 620 is representative of an example of a the system 100 that includes the start-up control circuit 108 and for which the start-up control circuit 108 is enabled. The diagram 620 includes a signal 622 representative of VIN for a power source 103 with an internal resistance of 0.15 Ohms, a signal 624 representative of VIN for a power source 103 with an internal resistance of 0.75 Ohms, a signal 626 representative of VIN for a power source 103 with an internal resistance of 10 Ohms, a signal 628 representative of VOUT for a power source 103 with an internal resistance of 0.15 Ohms, a signal 630 representative of VOUT for a power source 103 with an internal resistance of 0.75 Ohms, and a signal 632 representative of VOUT for a power source 103 with an internal resistance of 10 Ohms. As shown by the diagram 620, although the signal 626 includes a drop in value with respect to the signals 622 or 624, the drop in value is less than exhibited by the signal 606 of the diagram 600 and is transitory in nature. As shown by the signals 628, 630, and 632, a value of VOUT is slowly ramped up in value via control of the start-up control circuit 108 to prevent the drop in VIN exhibited by the signal 606, which can result in an undervoltage condition, as described above herein.

Figure 7:
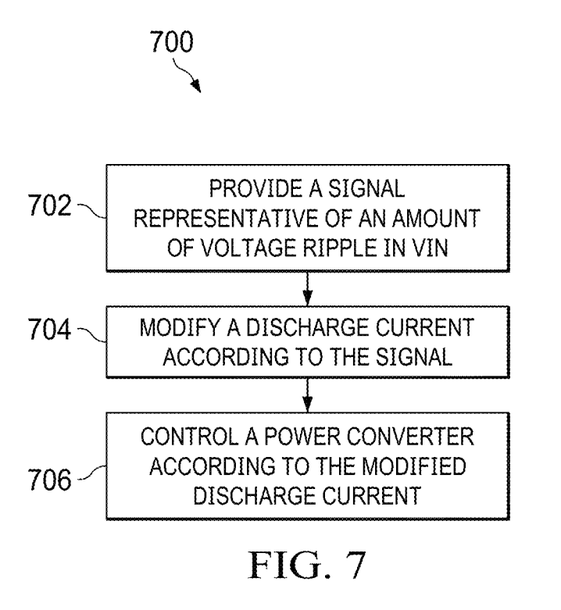
FIG. 7 is a flow diagram of a method, in accordance with various examples.

FIG. 7 is a flow diagram of a method 700, in accordance with various examples. In some examples, the method 700 is a method for controlling a power converter, such as the power converter 104 of FIG. 1. Accordingly, reference may be made in describing the method 700 to components or signals described above with respect to any of the preceding figures. In some examples, the method 700 is implemented at least in part by the start-up control circuit 108.

At operation 702, a signal representative of an amount of voltage ripple in VIN is provided. In some examples, the signal is a current having a value proportional to a voltage differential between VIN with voltage ripple and VIN with the voltage ripple filtered out. The signal may be provided by a voltage-to-current circuit that converts the voltage differential to a current representation.

At operation 704, a discharge current is modified according to the signal provided at operation 702. The discharge current may be a current according to which a capacitor is discharged. The capacitance of the capacitor and a value of the modified discharge current may control a duration of Toff for a power converter. For example, responsive to a voltage of the capacitor exceeding Vref, Toff may begin and responsive to the voltage of the capacitor being less than Vref, Toff may end.

At operation 706, a power converter is controlled according to the modified discharge current. For example, based on a comparison result between the capacitor voltage and Vref, a control signal is provided for controlling a low-side power transistor of the power converter. Responsive to the comparison result being asserted, the low-side power transistor is controlled to be conductive, beginning the Toff time of the power converter. Responsive to the comparison result being deasserted, the low-side power transistor is controlled to be non-conductive, ending the Toff time of the power converter.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. Apparatus, comprising:
   a filter having an input and an output;
   a voltage-to-current circuit having a first input, a second input, and an output, the first input coupled to the output of the filter and the second input coupled to the input of the filter;
   a first current source coupled to the output of the voltage-to-current circuit;
   a second current source coupled to the output of the voltage-to-current circuit;
   a capacitor coupled to the output of the voltage-to-current circuit; and
   a comparator having an input coupled to the output of the voltage-to-current circuit.

2. The apparatus of claim 1, wherein the capacitor is a first capacitor and the filter includes:
   a resistor coupled between the input of the filter and the output of the filter; and
   a second capacitor coupled to the output of the filter.

3. The apparatus of claim 1, wherein the voltage-to-current circuit includes:
   a transconductance amplifier having an amplifier output, and the first and second inputs, the first input of the transconductance amplifier coupled to the first input of the voltage-to-current circuit and the second input of the transconductance amplifier coupled to the second input of the voltage-to-current circuit;
   a first transistor having a first gate, a first drain, and a first source, the first drain coupled to the amplifier output;
   a second capacitor coupled to the first source;
   a third current source coupled to the first source;
   a second transistor having a second gate, a second drain, and a second source, the second gate coupled to the first source, and the second drain coupled to the output of the voltage-to-current circuit; and
   a resistor coupled to the second source.

4. The apparatus of claim 1, further comprising an inverter coupled between the output of the comparator and the first current source, wherein the second current source is coupled to the output of the comparator.

5. The apparatus of claim 1, further comprising a buffer having a buffer input and a buffer output, the buffer input coupled to the output of the comparator, wherein the buffer includes an even number of inverters coupled in series between the buffer input and the buffer output.

6. The apparatus of claim 1, wherein the voltage-to-current circuit is configurable to provide a first signal having a value representative of an amplitude of transient oscillations of a second signal received at the input of the filter.

7. The apparatus of claim 6, wherein the capacitor is configurable to integrate a discharge current to provide a capacitor voltage at the input of the comparator, the discharge current having a value of a first current provided by the first current source minus a value of the first signal.

8. Apparatus, comprising:
   a filter configurable to receive an input voltage and produce a filtered signal responsive to the input voltage;
   a voltage-to-current circuit configurable to provide a signal having a current representative of a difference in voltage between the input voltage and the filtered signal;
   a capacitor;
   a first current source configurable to provide a discharge current to the capacitor;
   a second current source configurable to provide a charge current to the capacitor, wherein the capacitor is configured configurable to produce a capacitor voltage responsive to the discharge current, the charge current, and the signal;
   and
   a comparator configurable to compare the capacitor voltage to a reference voltage to provide a comparison result.

9. The apparatus of claim 8, wherein the filter is a low-pass filter.

10. The apparatus of claim 8, wherein the voltage-to-current circuit includes:
    a transconductance amplifier having an amplifier output, the transconductance amplifier configured to receive the input voltage and the filtered signal;

a first transistor having a first gate, a first drain, and a first source, the first drain coupled to the amplifier output;

a second capacitor coupled to the first source;

a third current source coupled to the first source;

a second transistor having a second gate, a second drain, and a second source, the second gate coupled to the first source; and a resistor coupled to the second source.

11. The apparatus of claim 8, further comprising an inverter coupled between an output of the comparator and the first current source, wherein the second current source is coupled to an output of the comparator.

12. The apparatus of claim 11, wherein the first current source and the second current source are configured via the comparator and the inverter to have opposite conductive states.

13. The apparatus of claim 8, further comprising a buffer having a buffer input and a buffer output, the buffer input coupled to an output of the comparator, wherein the buffer is configured to provide a control signal based on the comparison result, and wherein the buffer includes an even number of inverters coupled in series between the buffer input and the buffer output.

14. A system, comprising:

a load;

a power source;

a power converter having a first input, a second input, and an output, the first input coupled to the power source and the output coupled to the load a filter having an output, the input coupled to the power source;

a voltage-to-current circuit having a first input, a second input, and an output, the first input coupled to output the output of the filter and the second input coupled to the input of the filter;

a first current source coupled to the output of the voltage-to-current circuit;

a second current source coupled to the output of the voltage-to-current circuit;

a capacitor coupled to the output of the voltage-to-current circuit;

a comparator having a comparator output and a comparator input, the comparator input coupled to the current output of the voltage-to-current circuit; and a buffer having a buffer input and a buffer output, the buffer input coupled to the comparator output and the buffer output coupled to the second input of the power converter.

15. The system of claim 14, wherein the filter is a low-pass filter.

16. The system of claim 14, wherein the capacitor is a first capacitor and the voltage-to-current circuit includes:

a transconductance amplifier having a first input, a second input, and an output, the first input coupled to the first input of the voltage-to-current circuit, and the second input coupled to the second input of the voltage-to-current circuit;

a first transistor having a first gate, a first drain, and a first source, the first drain coupled to the output of the transconductance amplifier;

a second capacitor coupled to the first source;

a third current source coupled to the first source;

a second transistor having a second gate, a second drain, and a second source, the second gate coupled to the first source, and the second drain being the output of the voltage-to-current circuit; and a resistor coupled to the second source.

17. The system of claim 14, wherein the circuit includes an inverter coupled between the comparator output and the first current source, wherein the second current source is coupled to the comparator output.

18. The system of claim 14, wherein the buffer includes an even number of inverters coupled in series between the comparator output and the power converter.

19. The system of claim 14, wherein the voltage-to-current circuit is configurable to provide a first signal having a value representative of an amplitude of transient oscillations of a second signal received at the input of the filter.

20. The system of claim 19, wherein the capacitor is configurable to integrate a discharge current to provide a capacitor voltage at the comparator input, the discharge current having a value of a first current provided by the first current source minus a value of the first signal.

* * * * *